3,169,908
THERAPEUTIC 3-(α,α,α-TRIFLUORO-m-TOLYL-OXY)-1,2-PROPANEDIOL-1-CARBAMATE

Gilbert A. Youngdale, Kalamazoo, Mich., assignor to The Upjohn Company, Kalamazoo, Mich., a corporation of Delaware
No Drawing. Original application Aug. 4, 1961, Ser. No. 129,232, now Patent No. 3,103,533, dated Sept. 10, 1963. Divided and this application Feb. 15, 1963, Ser. No. 258,898
2 Claims. (Cl. 167—65)

The present invention relates to the novel 3-(α,α,α-trifluoro-m-tolyloxy)-1,2-propanediol-1-carbamate represented by the formula:

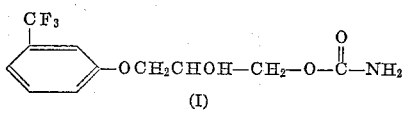

(I)

to novel compositions containing said compound, and to a method of utilizing said novel compositions as a tranquilizer and a muscle relaxant for the treatment of spastic and neuromuscular disorders. This application is a division of application Serial No. 129,232, filed August 4, 1961, now U.S. Patent 3,103,533.

The compound of the present invention is orally and parenterally active with long duration of action in birds, animals, mammals and humans.

The compound of the present invention can be prepared by conventional procedures utilizing 3-(α,α,α-trifluoro-m-tolyloxy)-1,2-propanediol (Lindenstruth et al., J. Am. Chem. Soc. 72, 1886, 1950) as the starting material. One such process involves reacting 3-(α,α,α-trifluoro-m-tolyloxy)-1,2-propanediol with excess diethyl carbonate and removing the produced ethanol and excess diethyl carbonate by distillation. The residue is mixed with a suitable solvent such as isopropyl alcohol and the mixture is then added with stirring to isopropyl alcohol saturated with ammonia. The isopropyl alcohol is removed under reduced pressure and the residue is dissolved in ether. The ether solution is washed with water and dried over anhydrous magnesium sulfate and the ether is removed by distillation. The resulting oil when crystallized from a suitable solvent results in the production of 3-(α,α,α-trifluoro-m-tolyloxy)-1,2-propanediol-1-carbamate. The desired 1-carbamate having Formula I above is often obtained in admixture with the 1,2-dicarbamate or the 2-carbamate. In such instances, the desired 1-carbamate can be separated from the mixture by conventional techniques such as chromatography or fractional crystallization. The separated 1-carbamate can then be further purified if so desired, for example, by recrystallization.

The following example is illustrative of the process and product of the present invention, but is not to be construed as limiting.

EXAMPLE 1

*3-(α,α,α-trifluoro-m-tolyloxy)-1,2-propanediol-1-carbamate*

To 20 g. (0.0846 mole) of molten (100° C.) 3-(α,α,α-trifluoro-m-tolyloxy)-1,2-propanediol was added with stirring 0.4 g. (0.0074 mole) of sodium methoxide and 75 ml. (73 g., 0.62 mole) of diethyl carbonate. The mixture was heated with stirring for 80 minutes; the produced ethanol was removed by distillation. At the end of the 80 minutes the internal temperature was 130° C. The remainder of the ethanol and excess diethyl carbonate were then removed by distillation under reduced pressure. The residue was mixed with 100 ml. of isopropyl alcohol and added with stirring to 150 ml. of isopropyl alcohol saturated with ammonia. The mixture was stirred for 16 hours at 25° C. in a sealed flask. The solvent was removed under reduced pressure and the residue was dissolved in ether. The ether solution was washed twice with water and dried over anhydrous magnesium sulfate. The ether was evaporated giving an oil which solidified on long standing. This solid (20.5 g.) was dissolved in 50 ml. of acetone and adsorbed on a chromatographic column containing 800 g. of Florisil (magnesium silicate). The column was eluted with acetone-Skellysolve B (Skellysolve B is essentially a mixture of hexanes having a boiling range of about 140–160° F.) mixtures, the proportion of acetone in the mixtures being gradually increased as the elution proceeded. The fractions having from 50 percent to 80 percent of acetone (by volume) were evaporated and the residual solids thus obtained were combined. After three recrystallizations of this material from ether-Skellysolve B, 3.55 g. of 3-(α,α,α-trifluoro-m-tolyloxy)-1,2-propanediol-1-carbamate, melting at 107.8–108.8° C., was obtained.

*Analysis.*—Calcd. for $C_{11}H_{12}F_3NO_4$: C, 47.32; H, 4.33; N, 5.02. Found: C, 47.28; H, 4.52; N, 5.18.

I.R. (mineral oil mull): NH, OH (3490, 3400, 3320, 3260, 3190); C=O (1723); C=C (1620, 1610, 1510, 1500); C—O (1345, 1327, 1240); $CF_3$ (1157, 1143, 1120, 1105, 1085); C—O (alcohol) (1070, 1035); ring (875, 863, 808, 785, 778, 703).

The compositions of the present invention are presented for oral administration to mammals in solid and liquid unit dosage forms, such as tablets, capsules, powders, granules, syrups, elixirs and the like, containing suitable quantities of 3-(α,α,α-trifluoro-m-tolyloxy)-1,2-propanediol-1-carbamate.

Powders are prepared by comminuting 3-(α,α,α-trifluoro-m-tolyloxy)-1,2-propanediol-1-cabamate to a suitable fine size and mixing with a similarly comminuted diluent. The diluent can be an edible carbohydrate material such as starch. Advantageously, a sweetening agent is present as well as a flavoring agent. Dry granulations for reconstitution with water are prepared utilizing water-soluble diluents. A powder mixture of finely divided 3-(α,α,α-trifluoro-m-tolyloxy)-1,2-propanediol-1-carbamate and a water-soluble diluent such as sucrose, glucose, and the like is wetted with a binder such as acacia mucilage or gelatin solution and forced through a screen to form granules which are allowed to dry. Advantageously, a thickening or suspending agent such as methylcellulose is present as well as a wetting agent and flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder before the filling operation.

Tablets are made by preparing a powder mixture, granulating or slugging, adding a lubricant and pressing into tablets. The powder mixture is prepared by mixing 3-(α,α,α-trifluoro-m-tolyloxy)-1,2-propanediol-1-carbamate suitably comminuted, with a diluent or base such as starch, lactose, kaolin, dicalcium phosphate, and the like. The powder mixture can be granulated by wetting with a binder such as corn syrup, gelatin solution, methylcellulose solution or acacia mucilage and forcing through a screen. As an alternative to granulating, the powder mixture can be slugged, i.e., run through a tablet machine and the resulting imperfectly-formed tablets broken into pieces (slugs). The slugs can be lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of 3-($\alpha,\alpha,\alpha$-trifluoro-m-tolyloxy)-1,2-propanediol-1-carbamate for administration.

A syrup is prepared by suspending the 3-($\alpha,\alpha,\alpha$-trifluoro-m-tolyloxy)-1,2-propanediol-1-carbamate in a suitably flavored aqueous sucrose solution. Similarly an elixir is prepared utilizing a hydro-alcoholic vehicle. Elixirs are advantageous vehicles for use when another therapeutic agent, which is not sufficiently water-soluble, is to be included in the composition.

For parenteral administration aqueous fluid unit dosage forms can be prepared. In preparing the parenteral form, a measured amount of 3-($\alpha,\alpha,\alpha$-trifluoro-m-tolyloxy)-1,2-propanediol-1-carbamate is placed in a vial, and the vial and its contents are sterilized and sealed. An accompanying vial of sterile water is provided as a vehicle to form a suspension prior to administration. Advantageously, the sterile water can have dissolved therein a local anesthetic and a buffering agent.

Alternatively, a parenteral suspension can be prepared by suspending the 3-($\alpha,\alpha,\alpha$-trifluoro-m-tolyloxy)-1,2-propanediol-1-carbamate in a parenterally acceptable vegetable oil with or without additional adjuvants, and sterilizing after filling into vials.

For veterinary oral use 3-($\alpha,\alpha,\alpha$-trifluoro-m-tolyloxy)-1,2-propanediol-1-carbamate is conveniently prepared in the form of a food premix. The food premix can comprise 3-($\alpha,\alpha,\alpha$-trifluoro-m-tolyloxy)-1,2-propanediol-1-carbamate in admixture with an edible pharmaceutical diluent of the type previously mentioned such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in this specification, these being features of the present invention. Examples of suitable unit dosage forms in accord with this invention are tablets, capsules, pills, troches, powder packets, granules, wafers, cachets, segregated multiples of any of the foregoing, and other forms as herein described.

In addition to the administration of 3-($\alpha,\alpha,\alpha$-trifluoro-m-tolyloxy)-1,2-propanediol-1-carbamate as the principal active ingredient of compositions for the treatment of the conditions noted above, the said compound can be included with other types of compounds to obtain advantageous combinations of properties. Such combinations can include 3-($\alpha,\alpha,\alpha$-trifluoro-m-tolyloxy)-1,2-propanediol-1-carbamate in combination with analgetic agents such as codeine, aspirin, acetophenetidin, salicylamide and N-acetyl-p-aminophenol; hypnotic agents such as the barbiturates and chloral hydrate; steroids such as hydrocortisone, prednisolone and methylprednisolone; and other muscle relaxants such as chlorzoxazone, carisoprodol, mephenesin, meprobamate, phenaglycodol and zoxazolamine; and antihistamines such as chlorpheniramine maleate, prophenpyridamine maleate, and pyrilamine.

The amount of 3-($\alpha,\alpha,\alpha$-trifluoro-m-tolyloxy)-1,2-propanediol-1-carbamate that is to be administered depends on the age, weight of the patient, the particular condition to be treated, and the route of administration. A dose of from about 3 to about 25 mg. per kg. of body weight or a total dose for humans of from about 200 to about 1500 mg. given as a single dose, which can be repeated in 3–4 hours, embraces the preferred dosage range for the relief of the above-noted conditions for which the said compounds are effective.

Veterinary dosages will correspond to human dosages with amounts administered being in proportion to the weight of the animal as compared to adult humans.

The 3-($\alpha,\alpha,\alpha$-trifluoro-m-tolyloxy)-1,2-propanediol-1-carbamate is compounded with a suitable pharmaceutical diluent in unit dosage form. For convenient and effective administration in a preferred embodiment of this invention, a unit dosage form containing 3-($\alpha,\alpha,\alpha$-trifluoro-m-tolyloxy)-1,2-propanediol-1-carbamate in an amount of from about 200 mg. to about 1500 mg. is administered. The dosage of compositions containing 3-($\alpha,\alpha,\alpha$-trifluoro-m-tolyloxy)-1,2-propanediol-1-carbamate and one or more other active ingredients is to be determined with reference to the usual dosage of each such ingredient.

The following compositions are illustrative of the compositions of the present invention:

(1) TABLETS 10,000 scored tablets for oral use, each containing 500 mg. of 3-($\alpha,\alpha,\alpha$-trifluoro-m-tolyloxy)-1,2-propanediol-1-carbamate are prepared from the following ingredients:

| | Gm. |
|---|---|
| 3-($\alpha,\alpha,\alpha$-trifluoro-m-tolyloxy) - 1,2 - propanediol-1-carbamate | 5000 |
| Starch, U.S.P. | 350 |
| Talc, U.S.P. | 250 |
| Calcium stearate | 35 |

The powdered 3-($\alpha,\alpha,\alpha$-trifluoro-m-tolyloxy)-1,2-propanediol-1-carbamate is granulated with a 4 percent w./v. aqueous solution of methylcellulose U.S.P. (1500 c.p.s.). To the dried granules is added a mixture of the remainder of the ingredients and the final mixture compressed into tablets of proper weight. Statisfactory clinical response is obtained in adults with acute muscular back pain with 1 or 2 tablets every four hours. For moderate conditions or for children, a half tablet 3 times a day is used.

(2) CAPSULES 10,000 two-piece hard gelatin capsules for oral use, each containing 250 mg. of 3-($\alpha,\alpha,\alpha$-trifluoro-m-tolyloxy)-1,2-propanediol-1-carbamate are prepared from the following ingredients:

| | Gm. |
|---|---|
| 3-($\alpha,\alpha,\alpha$-trifluoro-m-tolyloxy) - 1,2 - propanediol-1-carbamate | 2500 |
| Lactose, U.S.P. | 1000 |
| Starch, U.S.P. | 300 |
| Talc, U.S.P. | 65 |
| Calcium stearate | 25 |

The powdered 3-($\alpha,\alpha,\alpha$-trifluoro-m-tolyloxy)-1,2-propanediol-1-carbamate is mixed with the starch-lactose mixture followed by the talc and calcium stearate. The final mixture is then encapsulated in the usual manner. One capsule is used every 3 hours to relax spasm of voluntary muscles.

(3) SOFT ELASTIC CAPSULES

One-piece soft elastic capsules for oral use, each containing 200 mg. of 3-($\alpha,\alpha,\alpha$-trifluoro-m-tolyloxy)-1,2-propanediol-1-carbamate are prepared in the usual manner by first dispersing the powdered active material in sufficient corn oil to render the material capsulatable.

(4) AQUEOUS SUSPENSION

An aqueous suspension for oral use containing in each 5 ml., 1 gram of 3-($\alpha,\alpha,\alpha$-trifluoro-m-tolyloxy)-1,2-propanediol-1-carbamate is prepared from the following ingredients:

| | |
|---|---|
| 3-($\alpha,\alpha,\alpha$-trifluoro-m-tolyloxy) - 1,2 - propanediol-1-carbamate, powdered _____gm__ | 2000 |
| Methylparaben, U.S.P. _____gm__ | 7.5 |
| Proplyparaben, U.S.P. _____gm__ | 2.5 |
| Saccharin sodium _____gm__ | 12.5 |
| Cyclamate sodium _____gm__ | 2.5 |
| Glycerin _____ml__ | 3000 |
| Tragacanth powder _____gm__ | 10 |
| Orange oil flavor _____gm__ | 10 |
| F.D. and C. Orange dye _____gm__ | 7.5 |
| Deionized water, q.s. to 10,000 ml. | |

(5) PARENTERAL SOLUTION

A sterile aqueous solution suitable for intramuscular or intravenous use and containing 100 mg. of 3-($\alpha,\alpha,\alpha$-trifluoro-m-tolyloxy)-1,2-propanediol-1-carbamate in each 2 milliliters is prepared from the following ingredients:

| | |
|---|---|
| 3-($\alpha,\alpha,\alpha$-trifluoro-m-tolyloxy) - 1,2 - propanediol-1-carbamate _____gm__ | 100 |
| Sodium metabisulfite _____gm__ | 1 |
| Polyethylene glycol 300 _____ml__ | 500 |
| Water for injection, q.s. to 1000 ml. | |

(6) PARENTERAL SUSPENSION

A sterile aqueous suspension suitable for intramuscular injection and containing in each milliliter 250 mg. of 3-($\alpha,\alpha,\alpha$-trifluoro-m-tolyloxy) - 1,2 - propanediol-1-carbamate is prepared from the following ingredients:

| | Gm. |
|---|---|
| Polyethylene glycol 4000, U.S.P. _____ | 3 |
| Sodium chloride _____ | 0.9 |
| Polysorbate 80, U.S.P. _____ | 0.4 |
| Sodium metabisulfite _____ | 0.1 |
| Methylparaben, U.S.P. _____ | 0.18 |
| Propylparaben, U.S.P. _____ | 0.02 |
| 3-($\alpha,\alpha,\alpha$-trifluoro-m-tolyloxy) - 1,2 - propanediol-1-carbamate (micronized) _____ | 25 |
| Water for injection, q.s. to 100 ml. | |

I claim:
1. A therapeutic composition comprising in unit dosage form from about 200 mg. to about 1500 mg. of 3-($\alpha,\alpha,\alpha$-trifluoro-m-tolyloxy)-1,2-propanediol-1-carbamate in association with a pharmaceutical carrier.
2. A process for the treatment of spastic and neuromuscular disorders in mammals comprising the administration of from about 200 mg. to about 1500 mg. of 3-($\alpha,\alpha,\alpha$-trifluoro-m-tolyloxy) - 1,2 - propanediol-1-carbamate in association with a pharmaceutical carrier.

References Cited by the Examiner
UNITED STATES PATENTS

| 2,609,386 | 9/52 | Lott _____ | 167—65 |
| 2,813,104 | 11/57 | McDowell _____ | 167—65 |

OTHER REFERENCES

Bradley: Nature, No. 4050, 1947, pp. 813–814.
Lindenstruth: Chem. Abst., vol. 44, pp. 9120–9121, 1950.
Mooradian: Chem. Abst., vol. 46, p. 929, 1952.
Yale: J. Med. and Pharm. Chem., vol. 1, No. 2, 1959.

JULIAN S. LEVITT, *Primary Examiner*.
FRANK CACCIAPAGLIA, Jr., *Examiner*.